United States Patent
Kato et al.

(10) Patent No.: US 9,649,930 B2
(45) Date of Patent: May 16, 2017

(54) FUEL INLET

(71) Applicant: FUTABA INDUSTRIAL CO., LTD., Aichi (JP)

(72) Inventors: Makoto Kato, Aichi (JP); Yukio Ozaki, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 54 days.

(21) Appl. No.: 14/434,487

(22) PCT Filed: Sep. 26, 2013

(86) PCT No.: PCT/JP2013/076056
§ 371 (c)(1),
(2) Date: Apr. 9, 2015

(87) PCT Pub. No.: WO2014/057815
PCT Pub. Date: Apr. 17, 2014

(65) Prior Publication Data
US 2015/0251532 A1    Sep. 10, 2015

(30) Foreign Application Priority Data
Oct. 12, 2012  (JP) ................. 2012-227046

(51) Int. Cl.
*B65D 3/00* (2006.01)
*B60K 15/04* (2006.01)
(Continued)

(52) U.S. Cl.
CPC ............ *B60K 15/04* (2013.01); *B60K 15/035* (2013.01); *B60K 2015/0346* (2013.01); *B60K 2015/03453* (2013.01); *B60K 2015/03538* (2013.01); *B60K 2015/047* (2013.01); *B60K 2015/0458* (2013.01)

(58) Field of Classification Search
CPC ................ B60K 2015/03538; B60K 2015/047
(Continued)

(56) References Cited

U.S. PATENT DOCUMENTS 4,722,454 A    2/1988  Fischer
4,762,247 A    8/1988  Temmesfeld
(Continued)

FOREIGN PATENT DOCUMENTS

JP         62120226 A     6/1987
JP         62125917 A     6/1987
(Continued)

OTHER PUBLICATIONS

International Search Report dated Nov. 29, 2013 for corresponding International Application No. PCT/JP2013/076056, filed Sep. 26, 2013.
(Continued)

*Primary Examiner* — Shawn M Braden
(74) *Attorney, Agent, or Firm* — David D. Brush; Westman, Champlin & Koehler, P.A.

(57) ABSTRACT

A fuel inlet includes: an inlet pipe to form a path to guide fuel to a fuel tank; a breather tube to form a path to guide vapor in the fuel tank toward a distal end portion of the inlet pipe; and a retainer provided at a distal end portion of the inlet pipe and including: an attachment and detachment mechanism to attach and detach a fuel filler cap; a restriction mechanism to restrict a distal end position of a fuel filling gun; and an air vent hole to allow passage of the vapor supplied from the breather tube toward the distal end portion of the inlet pipe. The retainer includes a first component including the attachment and detachment mechanism and a second component secured to the first component and including the restriction mechanism. The air vent hole is a gap formed between the first component and the second component.

8 Claims, 6 Drawing Sheets

(51) Int. Cl.
*B60K 15/035* (2006.01)
*B60K 15/03* (2006.01)

(58) Field of Classification Search
USPC .......................................................... 220/86.2
See application file for complete search history.

(56) References Cited

U.S. PATENT DOCUMENTS

| | | | | |
|---|---|---|---|---|
| 6,523,582 | B2 * | 2/2003 | Furuta | B60K 15/04 |
| | | | | 141/286 |
| 7,617,851 | B2 * | 11/2009 | Barnes | B60K 15/03504 |
| | | | | 137/588 |
| 8,096,332 | B2 * | 1/2012 | Hagano | B60K 15/04 |
| | | | | 141/285 |

FOREIGN PATENT DOCUMENTS

| | | | | | |
|---|---|---|---|---|---|
| JP | | 62178426 | A | 8/1987 | |
| JP | | 2010013006 | A | 1/2010 | |
| JP | WO | 2012074003 | A1 * | 6/2012 | ............. B60K 15/04 |
| JP | WO | 2012120983 | A1 * | 9/2012 | ............. B60K 15/04 |
| WO | | 2012120983 | A1 | 9/2012 | |

OTHER PUBLICATIONS

International Preliminary Report on Patentability and Written Opinion dated Apr. 14, 2015 for corresponding International Application No. PCT/JP2013/076056, filed Sep. 26, 2013.
English translation of the Japanese Office Action dated Oct. 4, 2016 for counterpart Japanese Application No. 2012-227046.

* cited by examiner

FUEL INLET

CROSS-REFERENCE TO RELATED APPLICATIONS

This Application is a Section 371 National Stage Application of International Application No. PCT/JP2013/076056, filed Sep. 26, 2013 and published as WO 2014/057815 A1, in Japanese, which claims the benefit of Japanese Patent Application No. 2012-227046, filed Oct. 12, 2012, the entire contents of PCT/JP2013/076056 and Japanese Patent Application No. 2012-227046 are incorporated herein by reference.

TECHNICAL FIELD

The present invention relates to a fuel inlet that is used to fill fuel into a fuel tank of a vehicle or the like.

BACKGROUND ART

There are known fuel inlets for filling fuel, such as gasoline, into a fuel tank of a vehicle or the like. In general, a fuel inlet (a filler pipe) is provided with an inlet pipe to guide fuel from a fuel filler port to a fuel tank; and a breather tube to guide air containing fuel vapor in the fuel tank, which is so-called vapor, toward a distal end portion of the inlet pipe to thereby reduce an internal pressure of the fuel tank.

At a distal end portion of the inlet pipe, there are provided a thread for detachably attaching a fuel filler cap and a restriction hole for restricting a distal end position of a fuel filling gun during refueling. Specifically, a retainer separate from the inlet pipe is provided at the distal end portion of the inlet pipe, and thereby the thread and the restriction hole are provided to the inlet pipe (see Patent Document 1). The retainer is an integrally formed single component having a portion where the thread is formed and a portion where the restriction hole is formed; the retainer is formed, for example, by drawing process.

It is possible to form the thread directly to the distal end portion of the inlet pipe. In this case, however, an impact caused by a collision of a vehicle or an applied load during refueling might reduce the strengths of a thread portion and a seal portion, causing deformation thereof. Accordingly, the above-described configuration, in which the thread is formed in the retainer, is preferable. Specifically, the distal end portion of the inlet pipe (a portion forming the fuel filler port) is required to have a higher strength as compared with portions other then the distal end portion. In this respect, the configuration including the retainer separate from the inlet pipe enables achievement of a required strength by means of the retainer, and thus the inlet pipe itself is not required to have an excess strength. In contrast, the configuration, in which the thread is formed directly to the inlet pipe, requires enhanced strength of the inlet pipe itself, and thus requires the entire inlet pipe to be formed using a thick material.

PRIOR ART DOCUMENTS

Patent Documents

Patent Document 1: Japanese Unexamined Patent Application Publication No. 2010-13006.

SUMMARY OF THE INVENTION

Problems to be Solved by the Invention

During refueling, the internal pressure of the fuel tank increases as the amount of fuel in the fuel tank increases, and the vapor or the fuel in the fuel tank is guided toward the distal end portion of the inlet pipe through the breather tube. The retainer is provided with an air vent hole formed, for example, by punching process, the air vent hole allowing the vapor, which is supplied from the breather tube toward the distal end portion of the inlet pipe, to pass therethrough and be discharged to the outside.

However, there has been a problem that, when a fuel amount approaches a full level, splashes are sometimes caused in the inlet pipe by the fuel blowing out of the breather tube, and the splashes of fuel caused as above pass through the air vent hole and jump out.

In one aspect of the present invention, it is desirable to inhibit the splashes of fuel caused in the inlet pipe from jumping out.

Means for Solving the Problems

A fuel inlet in one aspect of the present invention comprises: an inlet pipe configured to form a path to guide fuel to a fuel tank; a breather tube configured to form a path to guide vapor in the fuel tank toward a distal end portion of the inlet pipe; and a retainer provided at a distal end portion of the inlet pipe and comprising: an attachment and detachment mechanism configured to attach and detach a fuel filler cap; a restriction mechanism configured to restrict a distal end position of a fuel filling gun; and an air vent hole configured to allow passage of the vapor that is supplied from the breather tube toward the distal end portion of the inlet pipe. The retainer comprises a first component that includes the attachment and detachment mechanism and a second component that is secured to the first component and includes the restriction mechanism. The air vent hole is a gap formed between the first component and the second component.

In the above-described configuration, the vapor that is supplied during refueling from the breather tube toward the distal end portion of the inlet pipe passes through the air vent hole formed in the retainer and is discharged to the outside. As a result, an internal pressure of the fuel tank is reduced. By reducing a width of the air vent hole, the possibility becomes higher that the vapor hits around the air vent hole. Particularly, in a case where a widthwise direction of the air vent hole is perpendicular to an axial direction of the retainer, the vapor is more likely to hit around the air vent hole. In this manner, it is possible to inhibit splashes of fuel, which are caused in the inlet pipe, for example, by blowing of the fuel out of the breather tube, from passing through the air vent hole and jumping out. However, it is difficult to form a hole having a sufficiently small width by punching process or the like. In this regard, according to the one aspect of the present invention, the gap formed between the first component and the second component is used to function as the air vent hole, and thus it is possible to easily form an air vent hole having a small width that is difficult to be formed by punching process or the like. Accordingly, it is possible to inhibit the splashes of fuel caused in the inlet pipe from jumping out.

Also, in the above-described configuration, the second component may be secured to the first component so as to externally cover an end portion of the first component. According to such configuration, an outer surface of the second component is located outer than an outer surface of the first component in a region where the air vent hole is formed, it is possible to inhibit the splashes of fuel from around the second component from passing through the air vent hole.

Further, in the above-described configuration, a size of the air vent hole may be adjusted according to a securing position of the second component with respect to the first component. According to such configuration, it is possible to manufacture a fuel inlet having the air vent hole of a different size formed in the retainer without changing the design of the first component or the second component. Accordingly, common use of components can be achieved, for example, in the case of redesigning the size of the air vent hole or in the case of manufacturing a plurality of types of fuel inlets, each type having the air vent hole of a different size.

Also, in the above-described configuration, a position of the restriction mechanism with respect to the inlet pipe may be adjusted according to an orientation (a rotation angle position) in which the second component is secured to the first component. According to such configuration, it is possible to manufacture a fuel inlet in which the position of the restriction mechanism with respect to the inlet is different without changing the design of the first component or the second component. Accordingly, common use of components can be achieved, for example, in the case of redesigning the position of the restriction mechanism or in the case of manufacturing a plurality of types of fuel inlets, each type having a differently positioned restriction mechanism.

Further, in the above-described configuration, a material used for the second component may have a thickness different from that of a material for the first component. According to such configuration, it is possible to reduce the material cost and weight of the retainer. Specifically, in a case where the retainer is formed as a single component, even when the strength required for the retainer varies by part, a thickness of the entire retainer needs to be designed based on a region required to have the greatest strength. In contrast, according to one aspect of the present invention, the thickness of the retainer may be made to be different by part by employing materials having different respective thicknesses for the first component and the second component; thus, the material cost and weight of the retainer can be reduced.

Moreover, in the above-described configuration, a material employed for the second component may have a thickness smaller than that of a material for the first component. According to such configuration, it is possible to maintain a higher strength in a fuel filler port region where higher strength is generally required, whereas employing a smaller thickness in a region where a required strength is lower as compared with the fuel filler port region.

EXPLANATION OF REFERENCE NUMERALS

1 . . . fuel inlet, 2 . . . inlet pipe, 3 . . . breather tube, 5 . . . retainer, 21 . . . filler portion, 31 . . . distal end portion, 51 . . . first component, 52 . . . second component, 53 . . . air vent hole, 514 . . . thread, 523 . . . restriction hole

MODE FOR CARRYING OUT THE INVENTION

Hereinafter, an embodiment to which the present invention is applied will be described with reference to the drawings.

[1. Configuration]

Figure 1:
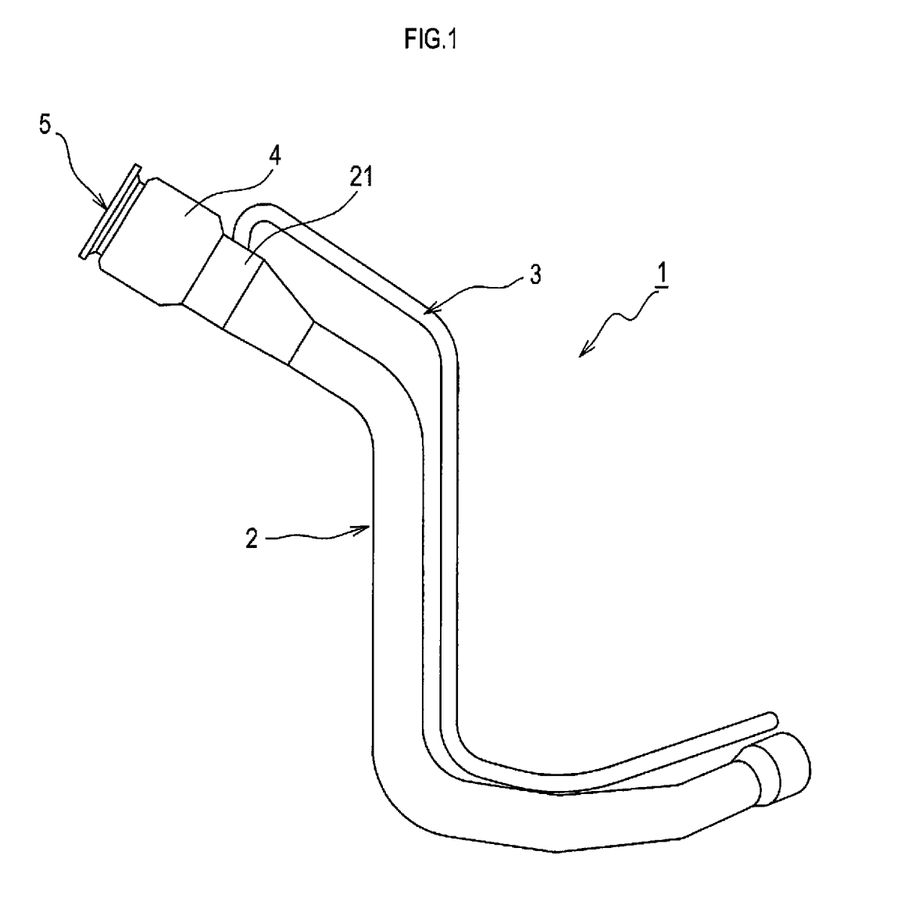
FIG. 1 is an appearance view of a fuel inlet according to an embodiment.

As shown in FIG. 1, a fuel inlet 1 of the present embodiment is a part for automobile, which is designed for use to fill fuel into a fuel tank. The fuel inlet 1 comprises an inlet pipe 2 and a breather tube 3.

The inlet pipe 2 is a cylindrical pipe that forms a fuel supply path to guide fuel (such as gasoline) from a fuel filler port to a fuel tank, and is made of metal in the present embodiment. In a distal end portion of the inlet pipe 2, a filler portion 21 having an enlarged diameter is formed, and a later-described retainer 5 is inserted and fixed in the filler portion 21 (see FIG. 2 and FIG. 3). An air filter 4 is provided on an outer circumference of a distal end portion of the filler portion 21.

Figure 3:
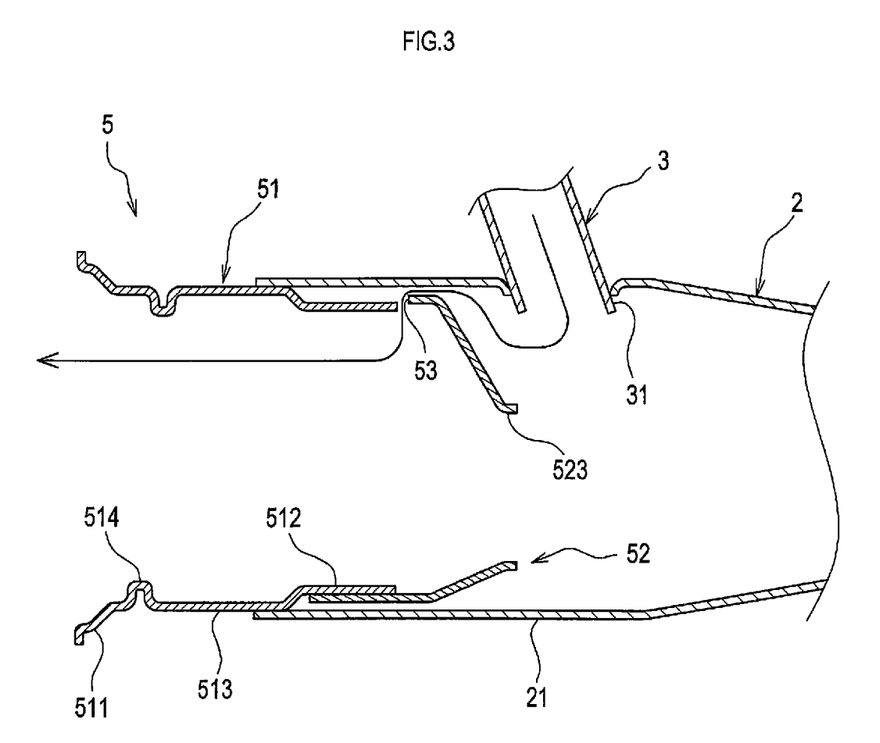
FIG. 3 is a sectional view of a distal end portion of the fuel inlet of the embodiment.

The breather tube 3 is a cylindrical pipe that forms an air vent path to guide so-called vapor, which is air containing fuel vapor in the fuel tank, toward a distal end portion of the inlet pipe 2, to thereby reduce an internal pressure of the fuel tank. The breather tube 3 is made of metal in the present embodiment. As shown in FIG. 3, the breather tube 3 is connected to the inlet pipe 2 such that a distal end portion 31 of the breather tube 3 penetrates an outer circumference of the inlet pipe 2, and is secured, for example, by brazing. In the present embodiment, the breather tube 3 is connected obliquely to the inlet pipe 2 (such that the distal end portion 31 is directed to a downstream side of the fuel supply path).

Figure 2:
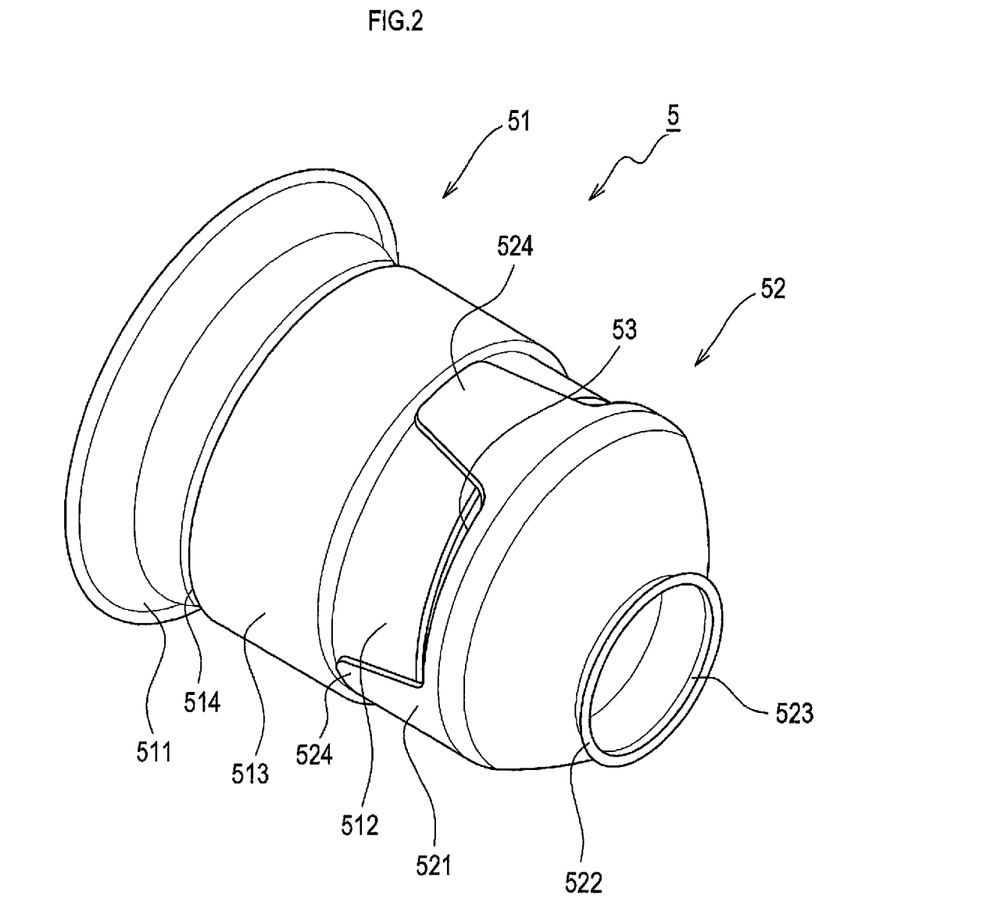
FIG. 2 is a perspective view of a retainer of the embodiment.

Also in the filler portion 21 of the inlet pipe 2, as shown in FIG. 1 and FIG. 2, the retainer 5 that is a separate component from the inlet pipe 2 is provided. The retainer 5 is a cylindrical component into which a fuel filling gun is to be inserted, and is made of metal in the present embodiment. Also, as shown in FIG. 3, the retainer 5 is secured, for example, by welding in a state where a part of the retainer 5 is inserted in the filler portion 21. The retainer 5 comprises a thread (helical engaging portion) 514 as an example of an attachment and detachment mechanism to attach and detach a not-shown fuel filler cap, and a restriction hole 523 as an example of a restriction mechanism to restrict a distal end position of the fuel filling gun during refueling. The retainer 5 further comprises an air vent hole 53 to allow vapor, which is supplied from the breather tube 3 toward the distal end portion of the inlet pipe 2, to pass therethrough and to be discharged to the outside.

Figure 4:
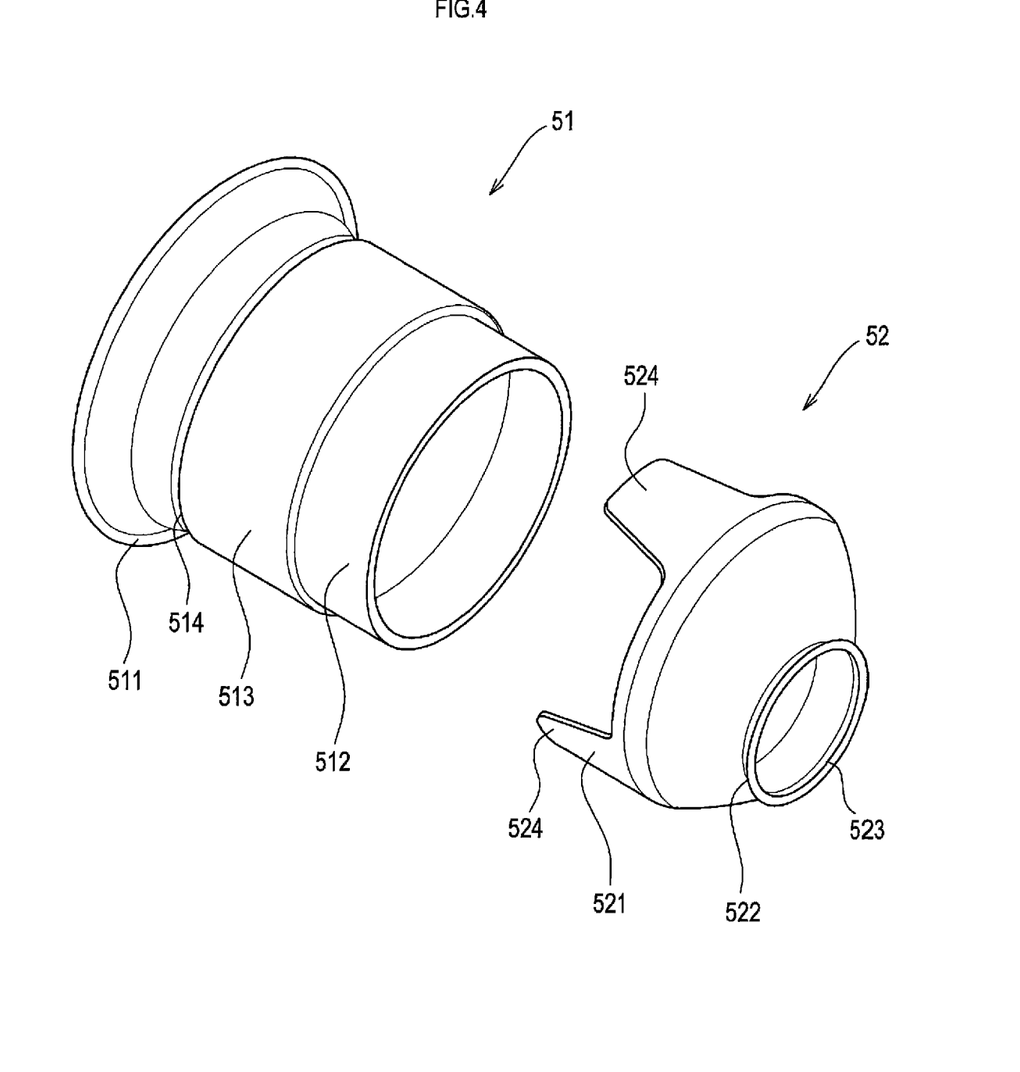
FIG. 4 is an exploded perspective view showing components of the retainer of the embodiment.

As shown in FIG. 3 and FIG. 4, the retainer 5 comprises two separate components, i.e., a first component 51 and a second component 52. The first component 51 includes the aforementioned thread 514; the second component 52 includes the aforementioned restriction hole 523. A gap between the first component 51 and the second component 52 is formed to serve as the aforementioned air vent hole 53.

The first component 51, which is a cylindrical component having openings at both end portions 511 and 512, is formed by drawing. Since the first component 51 is a component to form a fuel filler port region that is required to have a specified strength, the first component 51 is made of a material having a larger sheet thickness (for example, a stainless steel material having a sheet thickness of 1.2 mm) as compared with the inlet pipe 2, or the like.

An outer diameter of the first component 51 varies in an axial direction of the first component 51, whereas positions of central axes of respective outer diameters are constant (i.e., coaxial). Specifically, in the first component 51, the end portion (upstream end portion) 511 on an upstream side of the fuel supply path includes a part having an outer diameter larger than an inner diameter of the filler portion 21. The upstream end portion 511 is arranged to be exposed outside the filler portion 21, and forms the fuel filler port through which the fuel filling gun is inserted. Also, an inner circumferential surface of the upstream end portion 511 includes the thread 514.

On the other hand, in the first component 51, the end portion (downstream end portion) 512 on a downstream side of the fuel supply path is formed in a cylindrical shape having an outer diameter smaller than the inner diameter of the filler portion 21 (particularly, smaller than a sheet thickness of the second component 52). An end surface of the downstream end portion 512 is formed to be flat over its entire circumference (having a shape cut by a plane perpendicular to the axial direction).

In the first component 51, a middle portion 513 located between the upstream end portion 511 and the downstream end portion 512 is designed in a cylindrical shape having an outer diameter corresponding to the inner diameter of the filler portion 21 (for example, with a dimension that is equal to or slightly smaller than the inner diameter of the filler portion 21). The middle portion 513 is inserted into the filler portion 21, and is secured, for example, by welding, to the filler portion 21 such that there is no gap over the entire circumference of the distal end portion of the filler portion 21.

The second component 52, which is a cylindrical component having openings at both end portions 521 and 522, is formed by drawing. In the present embodiment, the second component 52 is made of a material having the same sheet thickness and material quality as the first component 51.

In the second component 52, the end portion (an upstream end portion) 521 on an upstream side of the fuel supply path is formed in a cylindrical shape having an inner diameter corresponding to the outer diameter of the downstream end portion 512 in the first component 51 (for example, with a dimension that is equal to or slightly larger than the outer diameter of the downstream end portion 512). However, the upstream end portion 521 includes cutouts provided at a plurality of positions (three positions in the present example) equally spaced in a circumferential direction, and the cylindrical shape having an entire circumference remains only partially. In other words, the upstream end portion 521 includes projecting portions 524 that project axially toward the first component 51 (toward the upstream side of the fuel supply path) at a plurality of positions (three positions in the present example) equally spaced in the circumferential direction.

On the other hand, in the second component 52, the end portion (downstream end portion) 522 on the downstream side of the fuel supply path includes a restriction hole 523 through which a distal end of the fuel filling gun is inserted during refueling. The restriction hole 523, which is designed to have a diameter that is smaller than the inner diameter of the filler portion 21 and also slightly larger than an outer diameter of the distal end of the fuel filling gun (such that there is some room therebetween), has a function to restrict the distal end position of the fuel filling gun.

The second component 52 is secured to the first component 51, and forms the retainer 5 in conjunction with the first component 51. Specifically, the upstream end portion 521 of the second component 52 is mounted to externally cover the downstream end portion 512 of the first component 51 and is secured by welding (for example, spot welding) or the like.

The second component 52 is secured to the first component 51 at such a position where the cutouts formed in the upstream end portion 521, each of the cutouts being located between circumferentially adjacent projecting portions 524, are not completely closed by the downstream end portion 512 of the first component 51. Specifically, part of each of the cutouts formed in the upstream end portion 521 is closed by the downstream end portion 512 of the first component 51, and the air vent holes 53, each having a slit-like shape with an axial width of an opening smaller than a circumferential width of the opening, are formed by the gaps between the first component 51 and the second component 52 at three positions equally spaced in the circumferential direction. Since the vapor from the breather tube 3 is supplied to the downstream side, from the retainer 5, of the fuel supply path in the inlet pipe 2, the vapor needs to pass (pass through) the retainer 5 in order to be discharged to the outside; the air vent holes 53 are designed to provide a passage for the vapor at that time.

The size of the air vent hole 53 (the width) may be adjustable depending on a relative positional relationship between the first component 51 and the second component 52 in the axial direction of a connecting portion (cylindrical portion) of the first component 51 and the second component 52. Specifically, it is possible to adjust an opening area of the air vent hole 53 by adjusting a securing position (a position of the aforementioned connecting portion in the axial direction) of the second component 52 to the first component 51 in a manufacturing process of the retainer 5. That is, it is possible to manufacture the retainer 5 having the air vent hole 53 of a different size using the same components.

Also, a position (an angle position in the circumferential direction around the axial direction of the inlet pipe 2) of the restriction hole 523 with respect to the inlet pipe 2 may be adjustable according to an orientation (a rotation angle position) in which the second component 52 is secured to the first component 51. Specifically, it is possible to adjust a position of the restriction hole 523 without changing a position of the thread 514 with respect to the inlet pipe 2 by adjusting the orientation (the rotation angle position) of the second component 52 with respect to the first component 51 in the manufacturing process of the retainer 5. That is, it is possible to manufacture the fuel inlet 1 having the thread 514 at the same position and the restriction hole 523 at a different position with respect to the inlet pipe 2 using the same components.

[2. Operation]

Next, a description will be given of an operation of the fuel inlet 1.

During refueling with the fuel filling gun, the internal pressure of the fuel tank increases as the amount of fuel in the fuel tank increases, and the vapor or the fuel in the fuel tank is guided through the breather tube 3 toward the distal end portion of the inlet pipe 2. The vapor that is supplied from the breather tube 3 toward the distal end portion of the inlet pipe 2 during refueling passes through the air vent hole 53 formed in the retainer 5 and is discharged to the outside. As a result, the internal pressure of the fuel tank is reduced.

When the fuel amount approaches a full level, the fuel together with the vapor sometimes blows out of the breather tube 3, causing splashes of fuel inside the inlet pipe 2. This leads to a problem that the splashes of fuel caused as above pass through the air vent hole and jump out. In this regard, according to the present embodiment, the air vent hole 53 having a smaller width as compared with a hole formed by punching process, or the like, is formed by securing the second component 52 to the first component 51 in a closely arranged manner, and thus passage of the splashes of fuel is inhibited.

[3. Effects]

According to the embodiment detailed as above, the following effects can be obtained.

Figure 5:
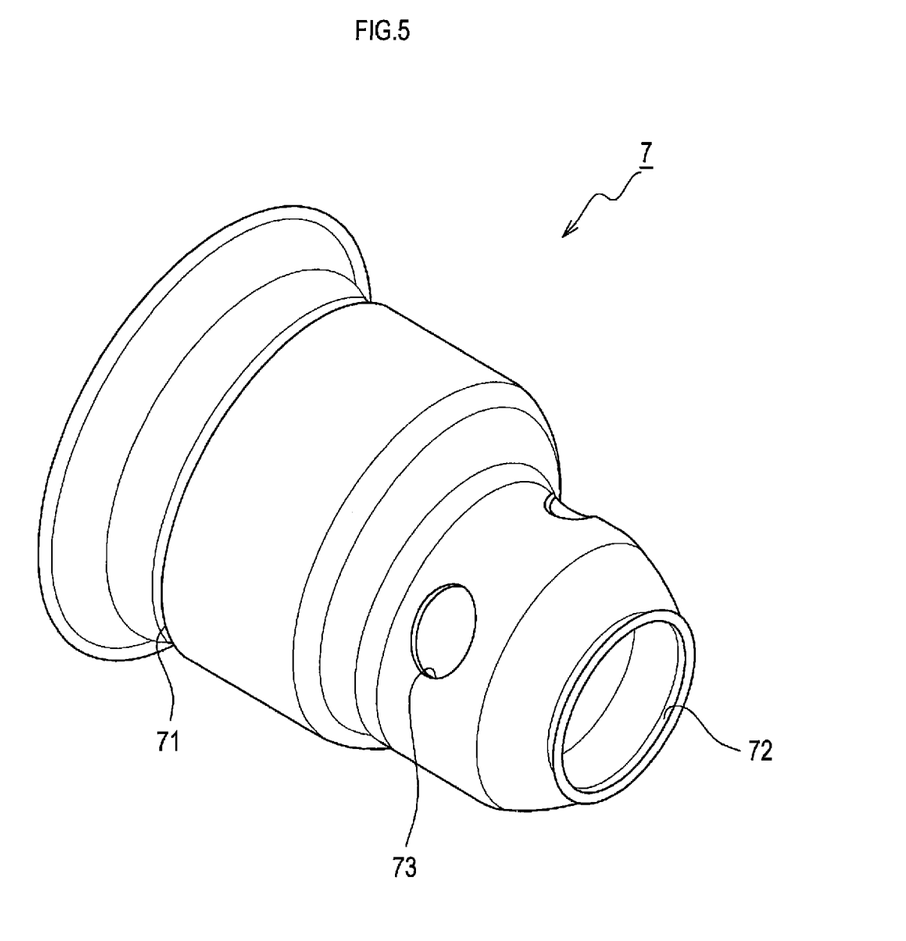
FIG. 5 is a perspective view of a retainer of a comparative example.
Figure 6:
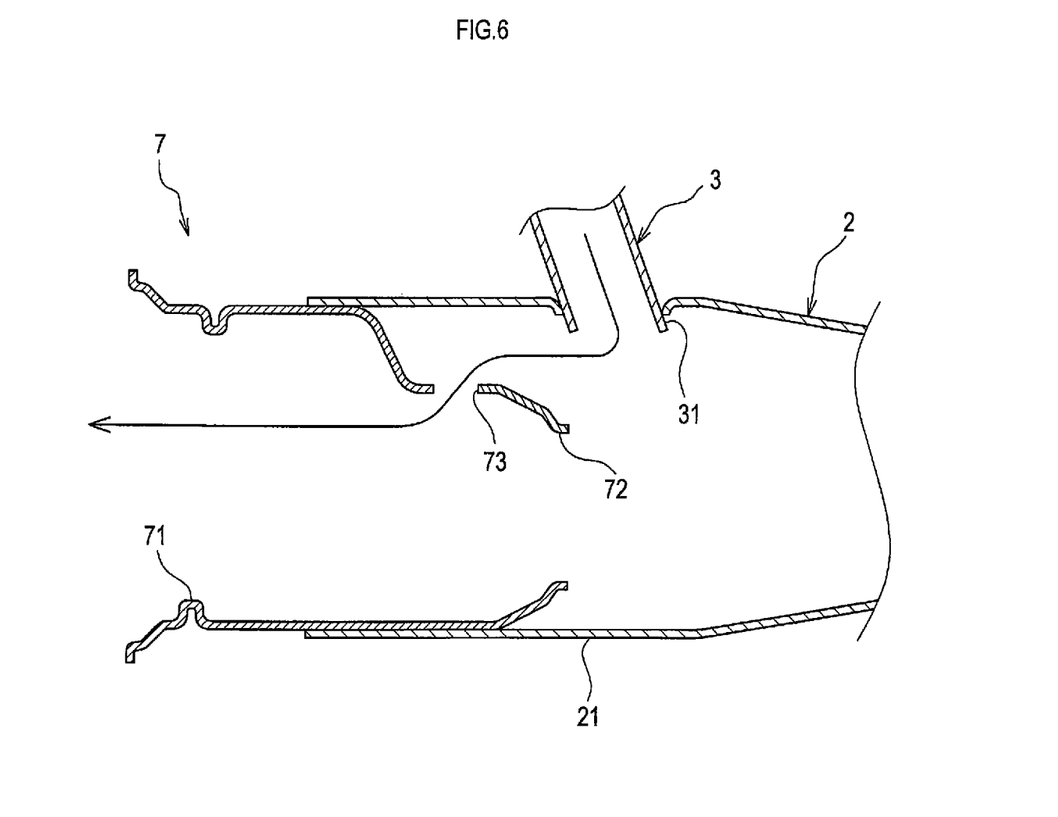
FIG. 6 is a sectional view of a distal end portion of a fuel inlet of the comparative example.

(1) According to the fuel inlet 1 of the present embodiment, it is possible to inhibit splashes of fuel caused in the inlet pipe 2 from jumping out. Specifically, in a retainer 7 as a comparative example shown in FIG. 5 and FIG. 6, for example, a thread 71, a restriction hole 72, and an air vent hole 73 are formed in a single component. The air vent hole 73, which is formed by punching process so as to penetrate a side face of the retainer 7, has a circular or substantially circular shape. Accordingly, splashes of fuel that have blown out of the breather tube 3 can easily pass through the air vent hole 73 and jump out. In contrast, the retainer 5 of the present embodiment comprises two separate components, i.e., the first component 51 and the second component 52, and the gap provided between these components as the air vent hole 53 has a shape with a small width (an elongated shape). In addition, the air vent hole 53 has a widthwise-direction perpendicular to an axial direction of the retainer 7. According to the present embodiment, therefore, if splashes are caused in the inlet pipe 2 by, for example, the fuel blowing out of the breather tube 3, the splashes (vapor) are more likely to hit around the air vent hole 53. As a result, it is possible to inhibit the splashes of fuel from passing through the air vent hole 53 and jumping out, according to the present embodiment. Further, in the case of forming a hole having an extremely small width, for example, by punching process, various problems in manufacturing may occur; according to the present embodiment in which the gap between the two components is configured to function as the air vent hole 53, a hole having a small width can be easily formed.

(2) The second component 52 is secured to the first component 51 so as to externally cover the end portion of the first component 51. Accordingly, in a region where the air vent hole 53 is formed, an outer surface of the second component 52 is located outer than an outer surface of the first component 51 by the sheet thickness of the second component 52. That is, when seen from the distal end portion 31 of the breather tube 3 (the downstream side of the fuel supply path), the air vent hole 53 is hidden by a step formed by the second component 52. As described above, a path from the distal end portion 31 of the breather tube 3 through the air vent hole 53 to the outside is complicated. Thus, it is possible to inhibit splashes of fuel from around the second component 52 from passing through the air vent hole 53.

(3) The size of the air vent hole 53 is adjusted depending on a securing position of the second component 52 to the first component 51. Accordingly, it is possible to manufacture the fuel inlet 1 having the air vent hole 53 of a different size without changing the design of the first component 51 or the second component 52. Specifically, for example, in the case of the retainer 7 of the aforementioned comparative example (see FIG. 5 and FIG. 6), it is required to change the design of the component itself in order to change the size of the air vent hole 73, which leads to large changes, such as redesigning of a die for punching process, and thus leads to increased manufacturing cost. In contrast, according to the present embodiment, it is not required to change the design of the first component 51 or the second component 52, and only a change in securing position thereof is sufficient. According to the present embodiment as described above, common use of components can be achieved, for example, in the case of redesigning the size of the air vent hole 53 or in the case of manufacturing a plurality of types of the fuel inlets 1, each type having the air vent hole 53 of a different size; thus, the manufacturing cost can be reduced.

(4) The position of the restriction hole 523 with respect to the inlet pipe 2 is adjusted according to the orientation (the rotation angle position) in which the second component 52 is secured to the first component 51. Accordingly, it is possible to manufacture the fuel inlet 1 having the restriction hole 523 positioned differently with respect to the inlet pipe 2 without changing the design of the first component 51 or the second component 52. It is particularly advantageous, according to the present embodiment, that it is possible to change the position of the restriction hole 523 without changing the position of the thread 514 with respect to the inlet pipe 2. Specifically, automobile manufacturers have a desire that the fuel filler cap be specifically oriented (for example, the knob is horizontally oriented) when tightening of the fuel filler cap is completed. In this regard, in a case where the thread 71 and the restriction hole 72 are integrally formed, for example, as in the retainer 7 of the aforementioned comparative example (see FIG. 5 and FIG. 6), if the position of the restriction hole 72 with respect to the inlet pipe 2 is changed, the position of the thread 71 (and thus the orientation of the fuel filler cap when tightening of the fuel filler cap is completed) will be also changed. In addition, any change in design of a component itself leads to increased manufacturing cost. In contrast, according to the present embodiment, it is possible to change the orientation (the rotation angle position) of the second component 52 with respect to the first component 51 without changing the orientation of the first component 51. Accordingly, common use of components can be achieved, for example, in the case of redesigning the position of the restriction hole 523 or in the case of manufacturing a plurality of types of the fuel inlets 1, each type having the restriction hole 523 that is differently positioned; thus, the manufacturing cost can be reduced. Further, the end surface of the downstream end portion 512 of the first component 51 is formed to be flat over its entire circumference, it is possible to maintain the shape of the air vent hole 53 regardless of how the orientation (the rotation angle position) of the second component 52 with respect to the first component 51 is adjusted.

(5) The configuration, in which the thread 71 and the restriction hole 72 are integrally formed as in the retainer 7 of the aforementioned comparative example (see FIG. 5 and FIG. 6), requires more drawing steps, and thus requires an annealing step when the retainer 7 is made of stainless steel material. In contrast, according to the present embodiment, drawing steps of the components can be reduced, and thus the annealing step can be omitted even when the retainer 7 is made of stainless steel material.

[4. Other Embodiments]

Although the embodiment of the present invention has been described above, it is to be understood that the present invention should not be limited to the above-described embodiment, and may be practiced in various forms.

(1) A material employed for the second component 52 may have a thickness different from that of the material for the first component 51. According to such configuration, the material cost and weight of the retainer 5 may be reduced. Specifically, in a case of forming the retainer 5 as a single component, the thickness of the entire retainer 5 needs to be designed according to a region required to have the greatest strength even when the required strength of the retainer 5 varies by part. In contrast, the thickness of the retainer 5 can be made to be different by part by employing materials having different respective thicknesses for the first component 51 and the second component 52; thus, the material cost and weight of the retainer 5 can be reduced.

Specifically, a material employed for the second component 52 may have a smaller thickness than that of a material for the first component 51. With such configuration, it is possible to maintain a higher strength in the fuel filler port region where higher strength is generally required, whereas employing a smaller thickness in a region where a required strength is lower as compared with the fuel filler port region.

(2) The second component 52 may be made of a different material from the material for the first component 51. With such configuration, the material cost and weight of the retainer 5 also may be reduced. Specifically, a material (for example, a stainless steel material different from a stainless steel material employed for the first component 51) having a lower strength than the material for the first component 51 may be employed for the second component 52.

(3) Although the above-described embodiment exemplifies a configuration in which the breather tube 3 is connected obliquely to the inlet pipe 2 (see FIG. 3), this should not be a limitation, and the breather tube 3 may be connected perpendicularly to the inlet pipe 2. According to the configuration where the breather tube 3 is connected obliquely to the inlet pipe 2 (such that the distal end portion 31 is directed to the downstream side of the fuel supply path), an effect can be achieved that splashes of fuel caused in the inlet pipe 2 are inhibited from jumping out. However, in the above-described embodiment, the gap between the first component 51 and the second component 52 forms the air vent hole 53; thus, it will be possible to sufficiently inhibit the splashes of fuel from jumping out also with the configuration where the breather tube 3 is connected perpendicularly to the inlet pipe 2. The configuration where the breather tube 3 is connected perpendicularly to the inlet pipe 2 has an effect of enabling easier manufacturing as compared with the configuration of oblique connection as in the above-described embodiment. For example, in the configuration where the breather tube 3 is connected obliquely to the inlet pipe 2, securing of the breather tube 3 to the inlet pipe 2 by welding is difficult, and needs to be performed by brazing. In contrast, in the configuration where the breather tube 3 is connected perpendicularly to the inlet pipe 2, the securing can be performed by welding.

(4) Although the air vent holes 53 are formed equally spaced in the circumferential direction in the above-described embodiment, this should not be a limitation, and a part where no air vent hole is formed and a part where an air vent hole is formed may be provided in the circumferential direction. In this case, the part where an air vent hole is formed may be arranged at a position distant from the distal end portion 31 of the breather tube 3 (for example, a position not facing the distal end portion 31). Such arrangement enables to effectively inhibit the splashes of fuel that have blown out of the breather tube 3 from passing through the air vent hole. Alternatively, the part where an air vent hole is formed may be arranged vertically upward. Such arrangement enables to inhibit the air vent hole from being closed by the fuel in the inlet pipe 2.

(5) Although the above-described embodiment exemplifies the air vent hole 53 shaped to extend in the circumferential direction with respect to an axial direction of the retainer 5, this should not be a limitation; for example, the air vent hole 53 may be shaped to extend in the axial direction of the retainer 5.

(6) Although, in the above-described embodiment, the connecting portion (the downstream end portion 512 and the upstream end portion 521) of the first component 51 and the second component 52 is formed in a cylindrical shape, and the orientation (the angle position) of the second component 52 with respect to the first component 51 is freely adjustable, this should not be a limitation. For example, the connecting portion of the first component 51 and the second component 52 may be formed in a shape other than a circle (for example, a polygonal shape, such as a hexagon or an octagon), to thereby restrict the orientation of the second component 52 with respect to the first component 51 to a plurality of orientations (rotation angle positions). Such configuration enables easy positioning during manufacturing, and thus enables reduction in product variation and in manufacturing cost.

(7) Elements of the present invention are conceptual, and should not be limited to those in the above-described embodiment. For example, functions that one element has may be divided among a plurality of elements, or functions that a plurality of elements have may be integrated to one element. Also, at least part of the configuration of the above-described embodiment may be replaced with a known configuration that has the same function.

The invention claimed is:

1. A fuel inlet comprising:
   an inlet pipe configured to form a path to guide fuel to a fuel tank;
   a breather tube configured to form a path to guide vapor in the fuel tank toward a distal end portion of the inlet pipe; and
   a retainer provided as a separate component from the inlet pipe at the distal end portion of the inlet pipe and comprising:
      a first component that includes an attachment and detachment mechanism configured to attach and detach a fuel filler cap;
      a second component that is secured to the first component and includes a restriction mechanism configured to restrict a distal end position of a fuel filling gun; and
      an air vent hole, which is formed by a gap between the first component and the second component and is configured to allow passage of the vapor that is supplied from the breather tube toward the distal end portion of the inlet pipe.

2. The fuel inlet according to claim 1, wherein the second component is secured to the first component such that the second component externally covers an end portion of the first component.

3. The fuel inlet according to claim 1, wherein a size of the air vent hole is adjusted according to a securing position of the second component with respect to the first component.

4. The fuel inlet according to claim 1, wherein a position of the restriction mechanism with respect to the inlet pipe is adjusted according to an orientation in which the second component is secured to the first component.

5. The fuel inlet according to claim 1, wherein:
   a downstream end portion of the first component, which is an end portion on a side where the second component is secured to the first component, is formed in a cylindrical shape;

an end surface of the downstream end portion is formed to have a shape cut by a plane perpendicular to an axial direction of the first component;

an upstream end portion of the second component is an end portion on a side where the second component is secured to the first component; the upstream end portion is formed in a cylindrical shape having an inner diameter corresponding to the outer diameter of the downstream end portion, with a dimension that is equal to or slightly larger than the outer diameter of the downstream end portion;

the upstream end portion includes a cutout;

the second component is secured to the first component at a position where part of the cutout is closed by the downstream end portion; and the air vent hole is a gap in the cutout, the gap being not closed by the downstream end portion, and the air vent hole has a slit-like shape with an axial width of an opening smaller than a circumferential width of the opening.

6. The fuel inlet according to claim 1, wherein the breather tube is connected to the inlet pipe downstream of the retainer.

7. The fuel inlet according to claim 1, wherein the breather tube is connected obliquely to the inlet pipe such that a distal end portion of the breather tube is directed to a downstream side of the inlet pipe.

8. The fuel inlet according to claim 1, wherein:
the inlet pipe has a filler portion formed in the distal end portion of the inlet pipe, having an enlarged diameter;
the retainer is inserted and fixed in the filler portion; and
a vapor path is formed to allow passage of the vapor from the breather tube between an inner diameter surface of the inlet pipe and an outer diameter surface of the retainer to the air vent hole.

* * * * *